United States Patent
Kim et al.

(10) Patent No.: US 9,713,185 B2
(45) Date of Patent: Jul. 18, 2017

(54) METHOD AND DEVICE FOR TRANSMITTING DISCOVERY SIGNAL

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 14/652,377

(22) PCT Filed: Dec. 20, 2013

(86) PCT No.: PCT/KR2013/011925
§ 371 (c)(1),
(2) Date: Jun. 15, 2015

(87) PCT Pub. No.: WO2014/098513
PCT Pub. Date: Jun. 26, 2014

(65) Prior Publication Data
US 2015/0334758 A1    Nov. 19, 2015

Related U.S. Application Data

(60) Provisional application No. 61/740,452, filed on Dec. 21, 2012, provisional application No. 61/754,949, filed on Jan. 21, 2013.

(51) Int. Cl.
*H04W 76/02*  (2009.01)
*H04J 11/00*  (2006.01)
*H04L 27/26*  (2006.01)

(52) U.S. Cl.
CPC .......... *H04W 76/023* (2013.01); *H04J 11/00* (2013.01); *H04L 27/2613* (2013.01)

(58) Field of Classification Search
CPC .... H04W 76/023; H04L 27/2613; H04J 11/00
See application file for complete search history.

(56) References Cited

U.S. PATENT DOCUMENTS

| | | | |
|---|---|---|---|
| 2009/0016284 A1 | 1/2009 | Laroia et al. | |
| 2010/0165882 A1* | 7/2010 | Palanki | H04W 8/005 370/254 |
| 2011/0268101 A1 | 11/2011 | Wang et al. | |

(Continued)

FOREIGN PATENT DOCUMENTS

| KR | 10-2008-0092941 | 10/2008 |
|---|---|---|
| KR | 10-2009-0004856 | 1/2009 |
| KR | 10-2011-0087323 | 8/2011 |

(Continued)

*Primary Examiner* — Thai Nguyen
(74) *Attorney, Agent, or Firm* — Lee Hong Degerman Kang Waimey (57) ABSTRACT

Provided are a method and a device for transmitting a discovery signal for a device-to-device (D2D) communication in a wireless communication system. A wireless device generates a random sequence on the basis of an identifier (ID), and determines generation information on the basis of the random sequence. The wireless device generates a discovery sequence on the basis of the generation information, and transmits the discovery sequence to another wireless device.

10 Claims, 9 Drawing Sheets

(56) References Cited

U.S. PATENT DOCUMENTS

2014/0064487 A1\* 3/2014 Abraham .............. H04L 63/045
                                                          380/270

FOREIGN PATENT DOCUMENTS

| KR | 10-2012-0112637 | 10/2012 |
| WO | 2007/082249 | 7/2007 |
| WO | 2007/082252 | 7/2007 |
| WO | 2008/143040 | 11/2008 |
| WO | 2011/079054 | 6/2011 |
| WO | 2012/128505 | 9/2012 |

\* cited by examiner

FIG. 9

METHOD AND DEVICE FOR TRANSMITTING DISCOVERY SIGNAL

CROSS-REFERENCE TO RELATED APPLICATIONS

This application is the National Stage filing under 35 U.S.C. 371 of International Application No. PCT/KR2013/011925, filed on Dec. 20, 2013, which claims the benefit of U.S. Provisional Application No. 61/740,452, filed on Dec. 21, 2012 and 61/754,949, filed on Jan. 21, 2013, the contents of which are all hereby incorporated by reference herein in their entirety.

BACKGROUND OF THE INVENTION

Field of the Invention

The present invention relates to wireless communications, and more particularly, to a method and apparatus for transmitting a discovery signal in a wireless communication system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Device-to-device (D2D) communication is a distributed communication technique in which adjacent wireless nodes directly deliver traffic. In the D2D communication, a wireless device such as a mobile phone autonomously discovers another wireless device which is physically adjacent, establishes a communication session, and thereafter transmits traffic. The D2D communication can solve a traffic overload problem by distributing traffic concentrated on a base station. The D2D technique such as Bluetooth or WiFi Direct directly supports communication between wireless nodes without a support of the base station.

For the D2D communication, there is a need for a discovery signal for discovering a device for participating in the D2D communication and a synchronization signal for achieving synchronization between D2D devices.

SUMMARY OF THE INVENTION

The present invention provides a method and apparatus for transmitting a discovery signal for discovering a device for participating in a device-to-device (D2D) communication.

In an aspect, a method of transmitting a discovery signal for a device-to-device (D2D) communication in a wireless communication system is provided. The method includes generating, by a wireless device, a random sequence on the basis of a device identifier (ID), determining, by the wireless device, generation information on the basis of the random sequence, generating, by the wireless device, a discovery sequence on the basis of the generation information, and transmitting, by the wireless device, the discovery sequence to a different wireless device.

The random sequence may comprise a bit sequence, and the generation information may be determined on the basis of bits in the bit sequence.

In another aspect, an apparatus for transmitting a discovery signal for a device-to-device (D2D) communication in a wireless communication system is provided. The apparatus includes a radio frequency (RF) unit configured to transmit and receive a radio signal, and a processor operatively coupled to the RF unit. The processor is configured to generate a random sequence on the basis of a device identifier (ID) for identifying the device, determine generation information on the basis of the random sequence, generate a discovery sequence on the basis of the generation information, and instruct the RF unit to transmit the discovery sequence to a different wireless device.

Synchronization for communication between wireless devices can be maintained, and a discovery signal having various types of information can be transmitted.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc, Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

A subframe is a resource allocation unit including a plurality of orthogonal frequency division multiplexing (OFDM) symbols. A data packet may be transmitted in one or more OFDM symbols of the subframe. A time required to transmit one subframe is defined as a transmission time interval (TTI). For example, one subframe may have a length of 1 millisecond (ms). The subframe may include two slots. For example, if the subframe includes 14 OFDM symbols, each of the two slots may include 7 OFDM symbols.

Since the 3GPP LTE uses orthogonal frequency division multiple access (OFDMA) in a downlink (DL), the OFDM symbol is only for expressing one symbol period in the time domain, and there is no limitation in a multiple access scheme or a terminology. For example, the OFDM symbol may also be referred to as another terminology such as a single carrier frequency division multiple access (SC-FDMA) symbol, a symbol period, etc.

The LTE system is not allowed for direct communication between wireless devices, and is scheduled by the BS. In order to disperse increasing data traffic, it is considered to support device-to-device (D2D) communication between the wireless devices without the BS or with the BS performing scheduling to a minimum extent.

Figure 1:
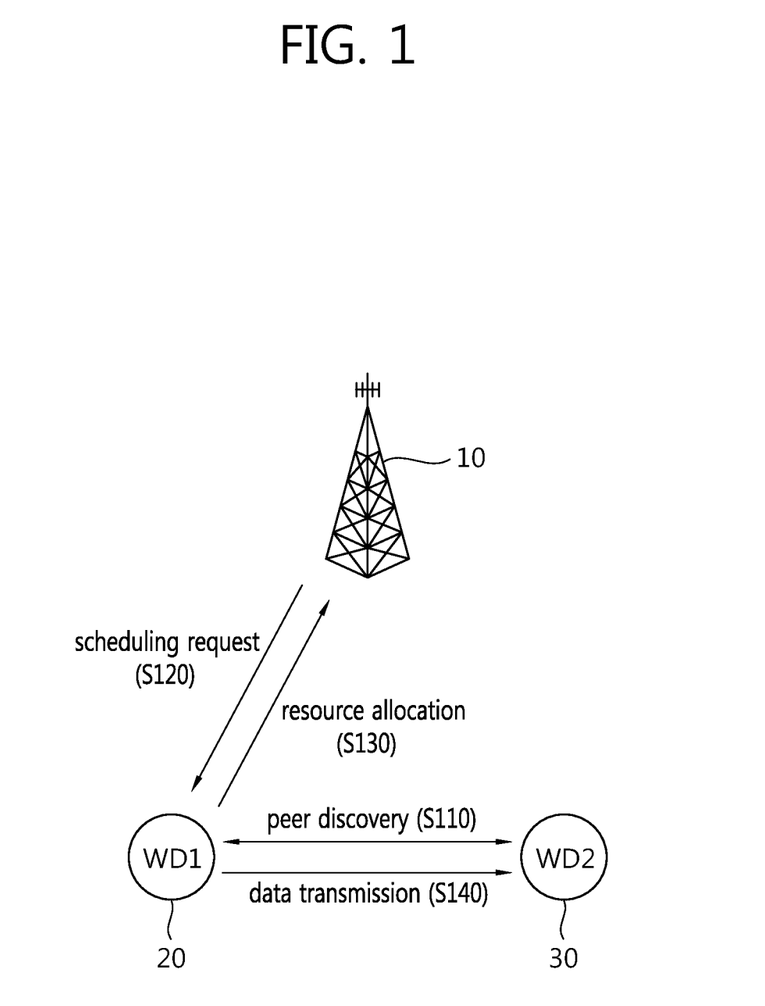
FIG. 1 shows an example of a device-to-device (D2D) communication.

FIG. 1 shows an example of a D2D communication.

Each of a $1^{st}$ wireless device (WD1) 20 and a $2^{nd}$ wireless device (WD2) 30 establishes a connection (e.g., a radio resource control (RRC) connection) with a BS 10.

The WD1 20 and the WD2 30 are located within a communication-possible distance, and perform a peer discovery to identify each other (S110). For the peer discovery, the WD1 20 and the WD2 30 may transmit a discovery signal and/or synchronization signal including identification information thereof. The WD1 20 and the WD2 30 may periodically search for a discovery signal of a peer device, or may search for the signal at a request of the BS.

Although only the two WDs 20 and 30 are considered herein, this is for exemplary purposes only. For clarity, it is described for example that the WD1 20 transmits data to the WD2 30.

The WD1 20 sends to the BS 10 a scheduling request for transmission to the WD2 30 (S120). The scheduling request may include information regarding a channel state (e.g., a channel quality indicator (CQI), a timing difference, etc.) between the WD1 20 and the WD2 30.

The BS 10 sends to the WD1 20 a resource allocation (S130). The WD1 20 transmits to the WD2 30 a data packet on the basis of the resource allocation (S140).

Although it is described herein that the D2D communication is performed between the wireless devices by scheduling of the BS, the embodiment of the present invention can be applied to a direct communication between the wireless devices without the intervention of the BS.

The discovery signal is a signal used to search for the peer device. Hereinafter, a method of generating and transmitting the discovery signal is described.

Figure 2:
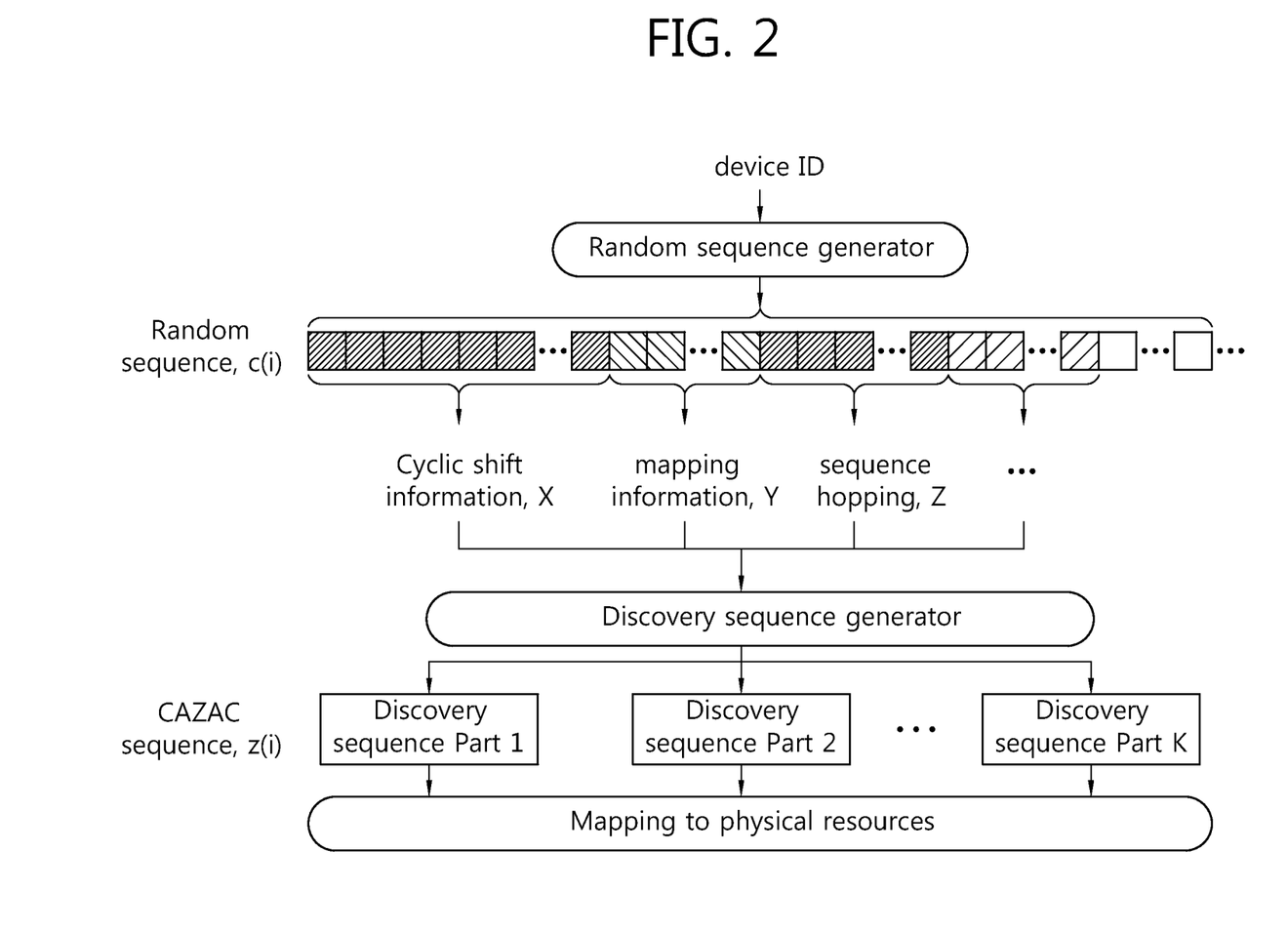
FIG. 2 shows an operation of generating a discovery signal according to an embodiment of the present invention.

FIG. 2 shows an operation of generating a discovery signal according to an embodiment of the present invention.

A wireless device generates a random sequence through a random sequence generator on the basis of a device identifier (ID). The random sequence is for an exemplary purpose only, and may be an initial sequence generated on the basis of the device ID. The device ID may indicate an identifier of a wireless device for transmitting the discovery signal or an identifier of a device group to which the wireless device belongs. The identifier of the wireless device may be indicated as a medium access control (MAC) address of the device, a cell-radio network temporary identifier (C-RNT), a group ID, etc.

The device ID may be used as an initial value of the random sequence, or may be used as cyclic redundancy check (CRC) masking of the random sequence, or may be used for masking of the random sequence.

The random sequence may include a sequence capable of confirming the device ID. In one embodiment, the random sequence may be defined as a pseudo random sequence c(i) as follows.

$c(i)=(x_1(i+N)+x_2(i+N))\mod 2$ $x_1(i+K)=(x_1(i+3)+x_1(i))\mod 2$ $x_2(i+K)=(x_2(i+3)+x_2(i+2)+x_2(i+1)+x_2(i))\mod 2$ [Equation 1]

Herein, N is a length of a pseudo random sequence c(i), K is a constant, $x_1(i)$ is a $1^{st}$ m-sequence, and $x_2(i)$ is a $2^{nd}$ m-sequence. 'mod' denotes a modulo operation. The $1^{st}$ m-sequence or the $2^{nd}$ m-sequence may be initialized on the basis of the device ID.

Generation information of a discovery sequence for the discovery signal is determined on the basis of the generated random sequence. The discovery sequence is a sequence which is transmitted as the discovery signal.

The generation information is used to generate or transmit the discovery sequence, and may include information detected by a receiver from the discovery sequence. For example, if the random sequence is a bit sequence having a length 50, first 20 bits may indicate a first field of the generation information, next 15 bits may indicate a second field of the generation information, and last 15 bits may indicate a third field of the generation information.

For example, the discovery sequence may be defined as a Zadoff-Chu sequence having a length Ns as follows.

$$z(n) = e^{-j\frac{\pi qm(m+1)}{Ns}}$$ [Equation 2]

Herein, q is a root index, and m=0, 1, . . . , Ns−1. Ns and q are relatively prime.

The generation information may include any one of cyclic shift (CS) information, root index information, sequence hopping information, and sequence mapping information for the discovery sequence. The CS information indicates a CS amount for performing cyclic shift on a base sequence. The root index information may indicate a root index of a Zadoff-Chu sequence. If the Zadoff-Chu sequence is used as the discovery sequence, a plurality of base sequences and a plurality of CSs may be used. The generation information may include a base sequence and/or a CS index.

The sequence hopping information may include information indicating a specific group to which a sequence to be used belongs among a plurality of sequence groups. The sequence mapping information may include information by which the discovery sequence is mapped to a physical resource (e.g., a subcarrier and/or an OFDM symbol). The sequence mapping information may include comb information indicating whether the discovery sequence is mapped to a subcarrier having an odd index or a subcarrier having an even index. The sequence mapping information may include information indicating that the discovery sequence is mapped to a subcarrier corresponding to a multiple of B (where B is an integer).

The discovery signal may be defined with various sequences in addition to the Zadoff-Chu sequence. For example, a sequence for an uplink reference signal disclosed in the section 5.5.1 of 3GPP TS 36.211 V10.4.0 (2011-12) may be used as the discovery sequence.

In addition, the generation information may include any one of a scheduling request, a group indicator, a multi-hop indicator, an emergency indicator, neglect/indifference information, priority information, a group joining request, a group disjoining report, and a group seceding report.

The discovery sequence may be generated on the basis of the generation information. The discovery sequence is divided into one or more part sequences. Each part sequence is mapped to a physical resource, and is then transmitted.

The discovery signal may be transmitted periodically or according to a predetermined periodicity pattern across one or more subframes. The discovery signal may be transmitted in some or all OFDM symbols of the subframe. The discovery signal may be transmitted in a first or last OFDM symbol of the subframe.

Information regarding scheduling for transmitting the discovery signal may be reported by a BS to a wireless device. The BS may report a configuration regarding a generation or transmission of the discovery signal to the wireless device.

Figure 3:
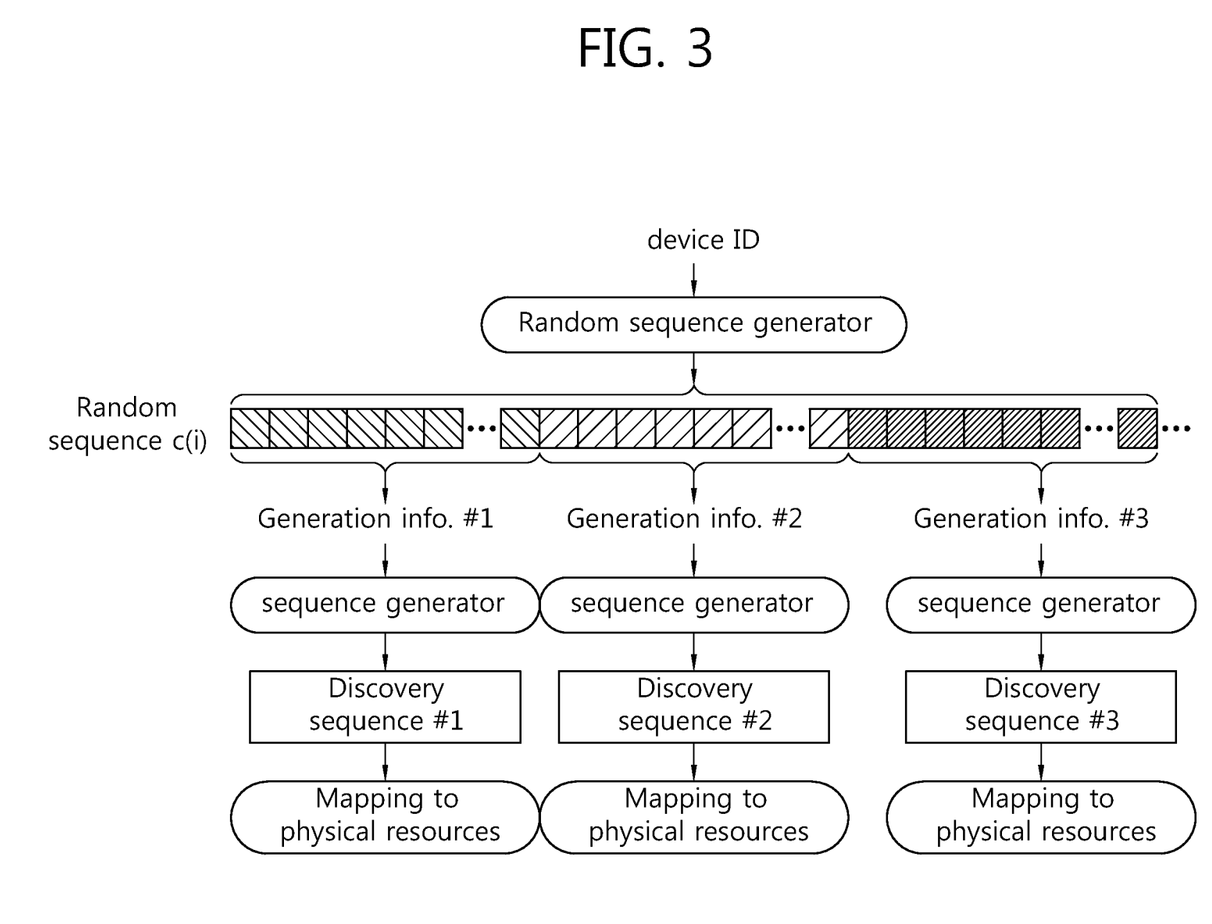
FIG. 3 shows an operation of generating a discovery signal according to anther embodiment of the present invention.

FIG. 3 shows an operation of generating a discovery signal according to anther embodiment of the present invention.

In comparison with the embodiment of FIG. 2, a random sequence is divided into a plurality of segments, and corresponding generation information is determined from each segment sequence. The same generation information or different generation information may be acquired from the plurality of segment sequences. The plurality of segment sequences may have the same or different length. A plurality of discovery sequences are generated according to each piece of generation information. Each of the plurality of discovery sequences is mapped to a physical resource, and is then transmitted.

In case of being configured in advance with a D2D pair, a peer device for receiving the discovery signal can know in advance a device ID of a wireless device for transmitting the discovery signal. Therefore, the peer device can generate a random sequence on the basis of the device ID. Since generation information can be known from the random sequence, the discovery signal can be detected.

If the peer device cannot know in advance the device ID of the wireless device for transmitting the discovery signal, blind decoding may be performed. In this case, the range of the device ID for performing the blind decoding may be limited, or the number of blind decoding attempts may be limited.

As described above, the discovery sequence may be defined by a CS of a base sequence. One base sequence is selected from a plurality of base sequences, and the discovery sequence may be generated by cyclically shifting the selected base sequence. Assume that an index of the selected base sequence is denoted by Nbs, and a CS index is denoted by Ncs. For Nbs and/or Ncs, symbol level hopping, slot level hopping, and/or subframe level hopping may be performed. In the symbol level hopping, Nbs and/or Ncs are given according to an OFDM symbol index. In the slot level hopping, Nbs and/or Ncs are given according to a slot index. In the subframe level hopping, Nbs and/or Ncs are given according to a subframe index.

Figure 4:
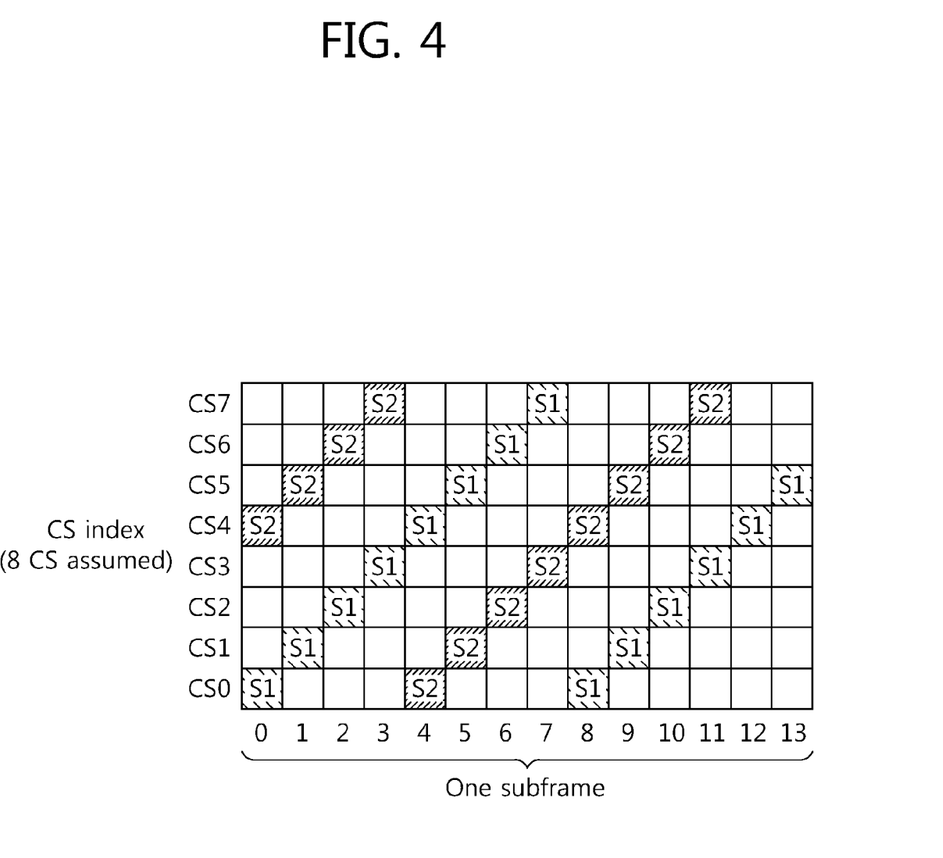
FIG. 4 shows an example of symbol-level hopping.

FIG. 4 shows an example of symbol-level hopping.

S1 denotes a $1^{st}$ discovery sequence, and S2 denotes a $2^{nd}$ discovery sequence. It is exemplified that a subframe includes 14 OFDM symbols indexed with 0 to 13. It is assumed that the total number of available CSs is 8, and a CS index is given from CS0 to CS7.

In a $1^{st}$ OFDM symbol, CS0 is applied to S1, and CS4 is applied to S2. In a $2^{nd}$ OFDM symbol, CS1 is applied to S1, and CS5 is applied to S2. That is, when an OFDM symbol index is incremented by 1, a CS index is also incremented by 1.

Figure 5:
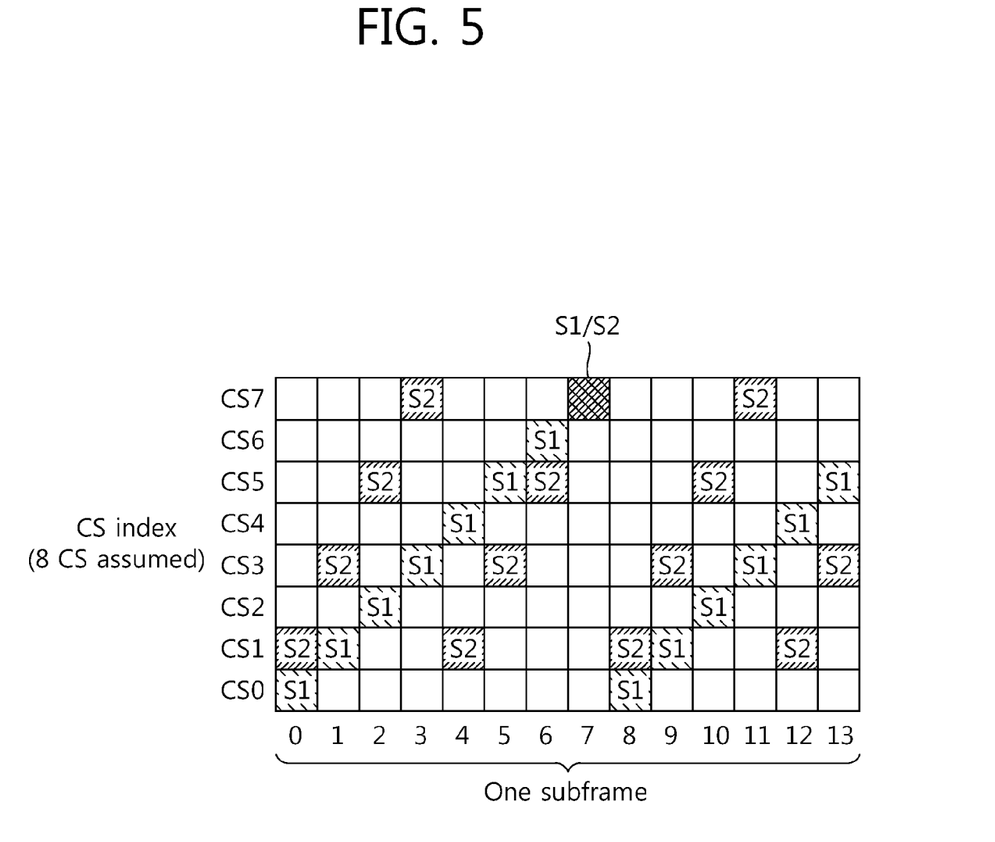
FIG. 5 shows another example of symbol-level hopping.

FIG. 5 shows another example of symbol-level hopping.

In a $1^{st}$ OFDM symbol, CS0 is applied to S1, and CS1 is applied to S2. In a $2^{nd}$ OFDM symbol, CS1 is applied to S1, and CS3 is applied to S2. That is, as to S1, when an OFDM symbol index is incremented by 1, a CS index is incremented by 1. As to S2, when the OFDM symbol index is incremented by 1, the CS index is incremented by 2. This shows that a hopping pattern may vary for each discovery sequence.

The discovery sequence may be transmitted across one or more subframes. Alternatively, the discovery sequence may be transmitted in one or more OFDM symbols in the subframe. One discovery sequence may be transmitted across a plurality of OFDM symbols. Alternatively, one discovery sequence may be transmitted in one or more OFDM symbols, and a copy version thereof may be repetitively transmitted in different OFDM symbols in the same subframe.

In one subframe, a discovery sequence based on different generation information may be transmitted in each symbol. For example, generation information may be obtained independently in each of a $1^{st}$ slot and a $2^{nd}$ slot. Information regarding a wireless device for transmitting a discovery signal may be acquired in the $1^{st}$ slot, and information regarding a wireless device for receiving the discovery signal may be acquired in the $2^{nd}$ slot.

In addition to the ID of the wireless device for transmitting the discovery signal (this is called a transmit (TX) ID), a random sequence may be generated based on the ID of the wireless device for receiving the discovery signal (this is called a receive (RX) ID). The random sequence may be generated based on a specific ID indicating a pair of the TX ID and the RX ID. Alternatively, the random sequence may be generated based on the TX ID (or the RX ID), and the generation information may include the RX ID (or the TX ID).

A $1^{st}$ discovery signal based on the TX ID and a $2^{nd}$ discovery signal based on the RX ID may be transmitted independently. The number of OFDM symbols for the $1^{st}$ discovery signal may be equal to or different from the number of OFDM symbols for the $2^{nd}$ discovery signal. The $1^{st}$ discovery signal and the $2^{nd}$ discovery signal may be transmitted in one subframe. The $1^{st}$ discovery signal may be transmitted in the $1^{st}$ slot, and the $2^{nd}$ discovery signal may be transmitted in the $2^{nd}$ slot. When an RX wireless device desires to confirm only a TX wireless device, only the $1^{st}$ discovery signal may be detected and the $2^{nd}$ discovery signal may be ignored.

When the discovery signal is a broadcast signal which is not specific to the RX wireless device, whether it is broadcast may be indicated by the discovery signal. For example, the generation information may include an indicator indicating whether it is broadcast. The RX wireless device may confirm that a corresponding discovery signal is broadcast, and thereafter may additionally determine whether to detect/demodulate a signal.

Figure 6:
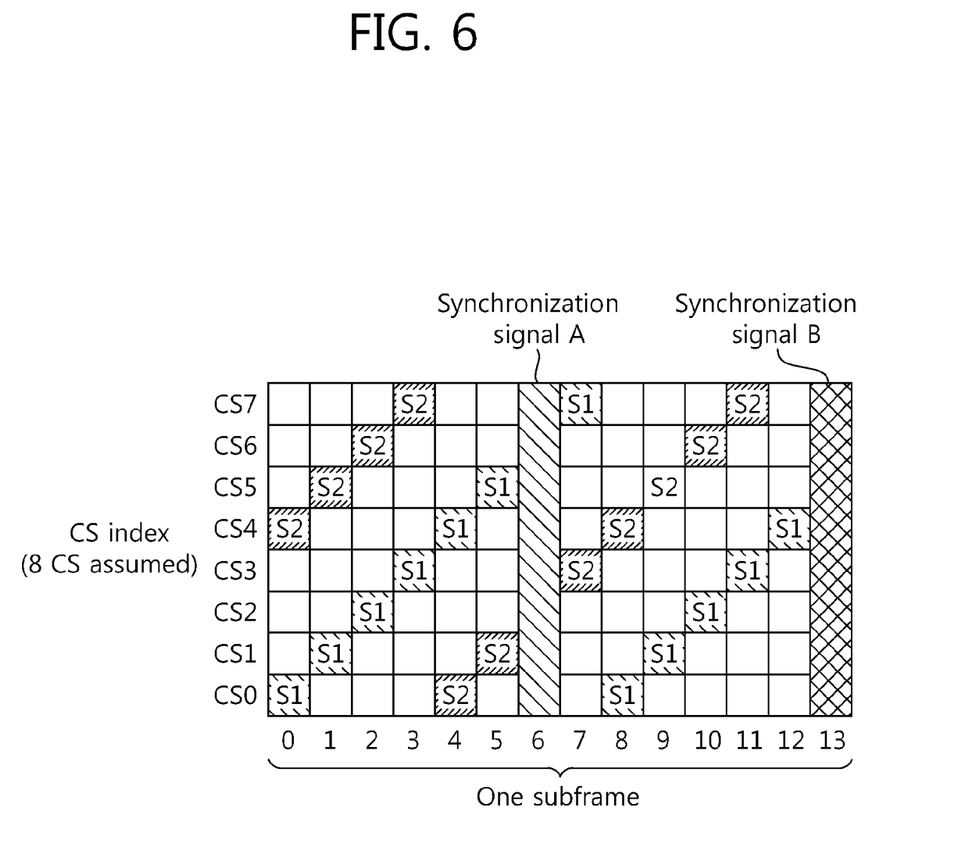
FIG. 6 shows an example of transmitting a synchronization signal together with a discovery signal.

FIG. 6 shows an example of transmitting a synchronization signal together with a discovery signal.

The synchronization signal is a signal for achieving synchronization between wireless devices, and may be transmitted in one or more OFDM symbols. Although it is shown herein that the synchronization signal is transmitted in a $7^{th}$ OFDM symbol and a $14^{th}$ OFDM symbol, the location or the number of OFDM symbols is for exemplary purposes only. Generating of a sequence for the synchronization signal may be configured independently from generating of a sequence for the discovery signal.

A peer discovery may be performed without recognizing a subframe boundary. For this, one of a plurality of OFDM symbols in one slot may be a copy version of a $1^{st}$ OFDM symbol to play a role of a cyclic prefix (CP). In doing so, there is an advantage in that the discovery signal can be recovered even if a timing error exists in one OFDM symbol.

Hereinafter, it is proposed a method of transmitting a discovery signal without using a signal for maintaining synchronization (e.g., a random access preamble, etc.) in a state where a wireless device is out of synchronization in D2D communication or cannot maintain synchronization in an idle mode.

Figure 7:
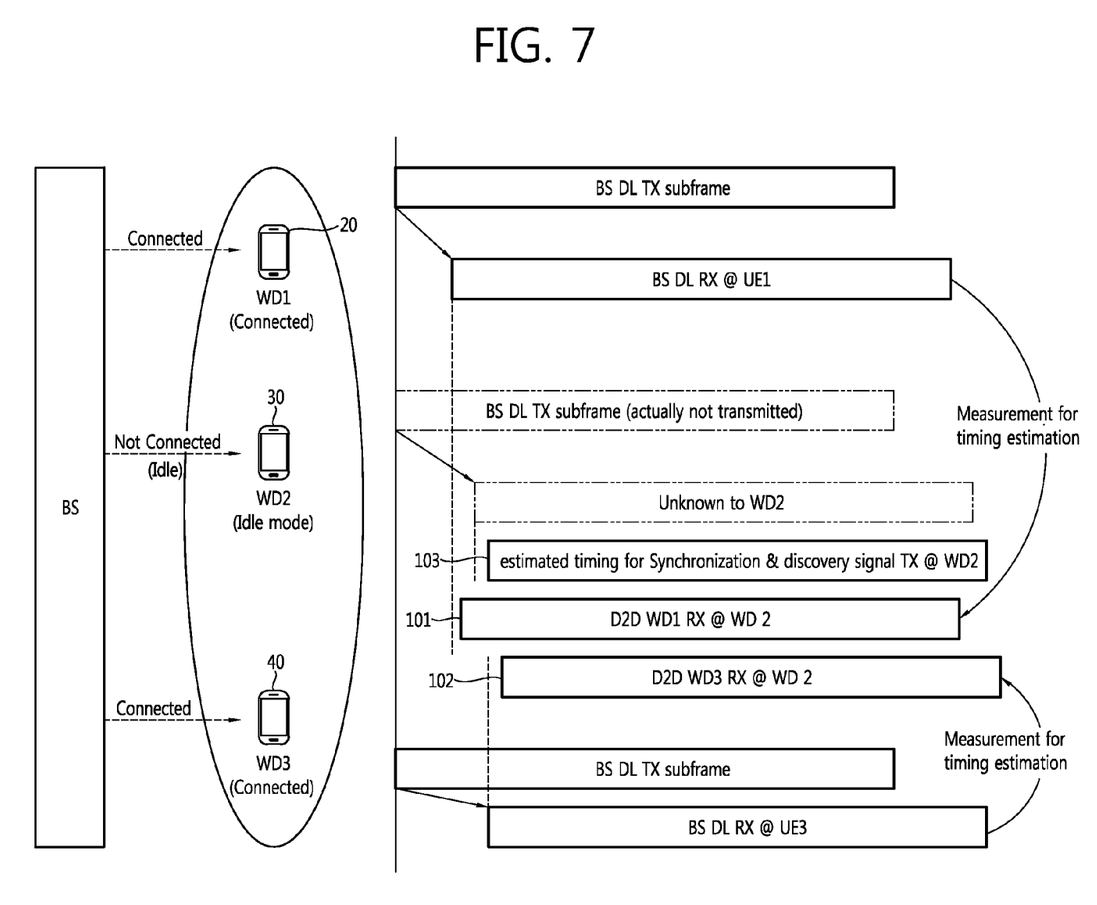
FIG. 7 shows a method of transmitting a discovery signal according to an embodiment of the present invention.

FIG. 7 shows a method of transmitting a discovery signal according to an embodiment of the present invention.

It is assumed that a WD1 20 and a WD3 40 are in a state of being connected with a BS, maintain synchronization, and know a timing at which a discovery signal is transmitted.

A WD2 30 is in an idle mode or cannot maintain synchronization. In order for the WD2 30 to transmit the discovery signal, a timing is first estimated from a signal (e.g., the discovery signal) transmitted by the WD1 20 and the WD3 40. It is assumed that the WD1 20, the WD2 30, and the WD3 40 perform D2D transmission and reception in accordance with a downlink (DL) TX subframe boundary of the BS. A discovery signal and/or a synchronization signal may be generated according to the aforementioned embodiment of FIG. 2 or FIG. 3.

For example, if it is assumed that 'timing advance (TA) of WD1 20<TA of WD2 30<TA of WD3 40', the WD2 30 may determine a TX timing 103 at which its discovery signal (and/or synchronization signal) is transmitted on the basis of a $1^{st}$ timing 101 at which a discovery signal of the WD1 20 is detected and a $2^{nd}$ timing 102 at which a discovery signal of the WD3 40 is detected. For example, the WD2 30 may determine an average of the $1^{st}$ timing 101 and the $2^{nd}$ timing 102 as the TX timing 103. Alternatively, the WD2 30 may determine one of the $1^{st}$ timing 101 and the $2^{nd}$ timing 102 as the TX timing 103.

Figure 8:
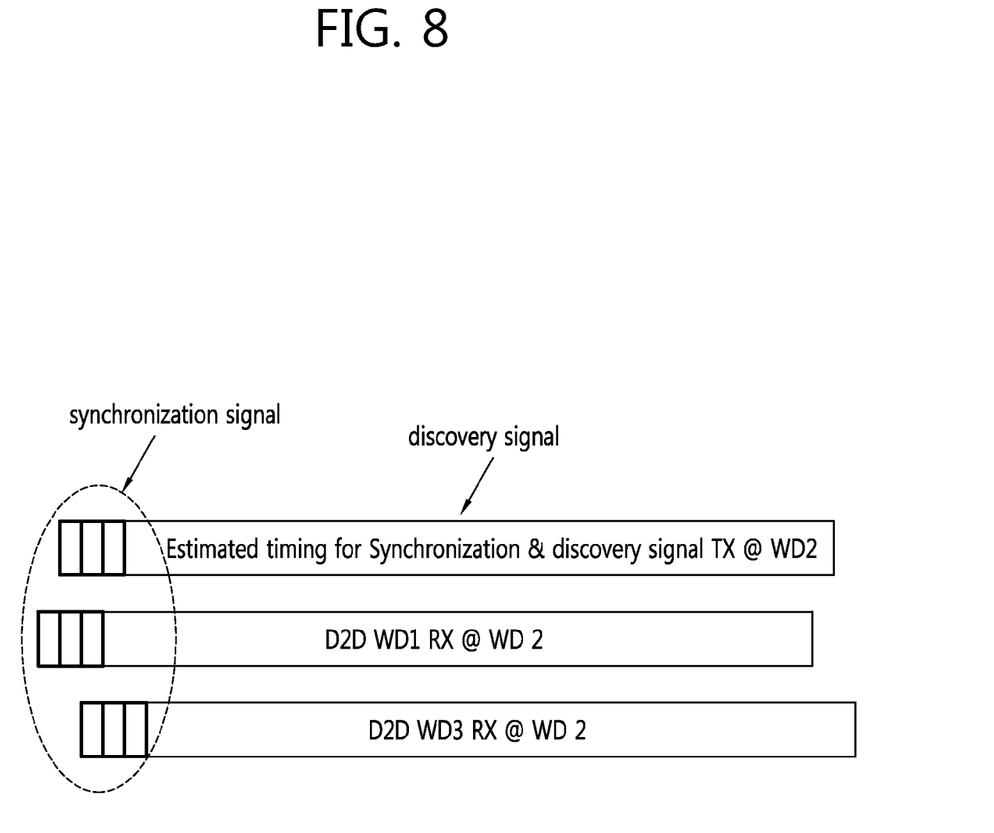
FIG. 8 shows an example of transmitting a synchronization signal and a discovery signal.

A signal of a special structure may be designed so that the TX timing of the discovery signal can be easily known by a different device. Assume that a discovery signal and a synchronization signal are transmitted in one subframe. The synchronization signal may be transmitted in a $1^{st}$ OFDM symbol, and the discovery signal may be transmitted in the remaining OFDM symbols. FIG. 8 shows an example of transmitting the synchronization signal and the discovery signal.

The synchronization signal may be transmitted in a specific OFDM symbol in every slot. If an OFDM symbol in which the synchronization signal is transmitted is predefined, the WD2 30 may discover synchronization signals of the WD1 20 and the WD3 40 to predict each subframe boundary. Therefore, the WD2 30 may recognize a duration from which synchronization signals and discovery signals of the WD1 20 and the WD3 40 start and until which the signals are maintained. On the basis of estimated timing, the WD2 30 may determine a timing at which the WD2 30 transmits its synchronization signal and discovery signal.

The WD2 30 may transmit the synchronization signal and the discovery signal according to its DL subframe boundary. If all neighboring wireless devices participating in D2D perform D2D transmission/reception according to DL subframe boundaries, the WD2 30 may also perform D2D transmission/reception according to the DL subframe boundary on the basis of this rule. In addition, the WD2 30 may adjust a TX timing from the DL subframe boundary by considering an estimated timing of a different wireless device. If the WD2 30 does not know the DL subframe boundary, the TX timing may be determined on the basis of a detected timing.

The WD2 30 may adjust the TX timing according to a timing offset from the DL subframe boundary. The timing offset may be autonomously determined by the WD2 30, or may be reported by a BS to the WD2 30. The timing offset may be adjusted according to RX power strength of a synchronization signal received by the WD2 30 (or attenuation level of the synchronization signal). For example, if RX power of the received synchronization signal is great (or the attenuation level of the synchronization signal is small), the timing offset may be decreased by determining that a distance to a neighboring wireless device is small. That is, transmission starts a bit earlier relatively from an RX timing. On the other hand, if the RX power is small (or the attenuation level of the synchronization signal is great), the timing offset may be increased by determining that the distance to the neighboring wireless device is far. That is, transmission starts much earlier relatively from the RX timing to compensate for a propagation delay. The BS may report a TX power value of the synchronization signal by using system information or the like, so that the wireless device can recognize the attenuation level.

According to the proposed signal transmission method, even if the wireless device does not know its TA and is not synchronized to a network, a signal of a neighboring wireless device can be discovered, and on the basis thereof, a TX timing of its D2D signal (i.e., a synchronization signal and/or a discovery signal) can be estimated.

In addition, assume that the wireless device knows its TA either according to the aforementioned method or from the BS. Even if the wireless device moves and thus the TA is modified, the wireless device can autonomously estimate the modified TA. The wireless device can detect mobility to calculate a specific direction in which the wireless device moves and a specific speed at which the wireless device moves, and may estimate the TA on the basis of mobility information.

It is preferable for a receiver that a plurality of synchronization signals received from a plurality of wireless devices are combined on a wireless channel so that it appears as if one signal is received. In order to detect a sum of the plurality of synchronization signals transmitted at different timings, it is required to design such that a signal distortion caused by a sum of time delays is not influenced in the detection of the synchronization signal. A method of repetitively transmitting a simple energy signal having a short period during a specific time is possible, and a Zadoff Chu sequence may be used as the synchronization signal.

Specific information may be included in the synchronization signal. For example, a wireless device belonging to a specific D2D group may transmit a synchronization signal having group related information, so that it is distinguished from other groups. Various methods may be applied to transmit the specific information through the synchronization signal. When generating a sequence for the synchronization signal, a sequence index may be allocated to be different from one group to another.

The synchronization signal may be generated based on a cell ID, or may be generated based on a device group ID. The synchronization signal may be generated based on a unique ID for inter-cell D2D. Upon detection of a plurality of synchronization signals regarding a plurality of D2D groups, the wireless device may select a D2D group to which the wireless device joins. The wireless device may join a D2D group corresponding to a synchronization signal having greatest signal strength. Alternatively, the wireless device may request the BS to select a D2D group to be joined.

A wireless device in an idle mode may not be able to detect a synchronization signal from another wireless device. To initiate D2D communication, the wireless device may know a synchronization signal timing (e.g., DL subframe boundary or TA) by the aid of the BS.

If synchronization signal transmission is performed under the control of a network, a D2D cluster may be configured by the network. A wireless device which cannot receive a synchronization signal transmitted by a different wireless device may transmit a synchronization signal under the instruction of the BS. A wireless device which receives the synchronization signal transmitted by the different wireless device may transmit the synchronization signal without the aid of the BS. The wireless device which transmits the synchronization signal under the instruction of the BS forms one D2D discovery cluster under the instruction of the BS. Thereafter, wireless devices neighboring to a corresponding wireless device play a role of extending a cluster by joining a corresponding cluster without an additional instruction. That is, although the generation of the D2D discovery cluster is adjusted by the BS, subsequent operations are autonomously performed by D2D devices, so that a related signaling overhead can be decreased.

Figure 9:
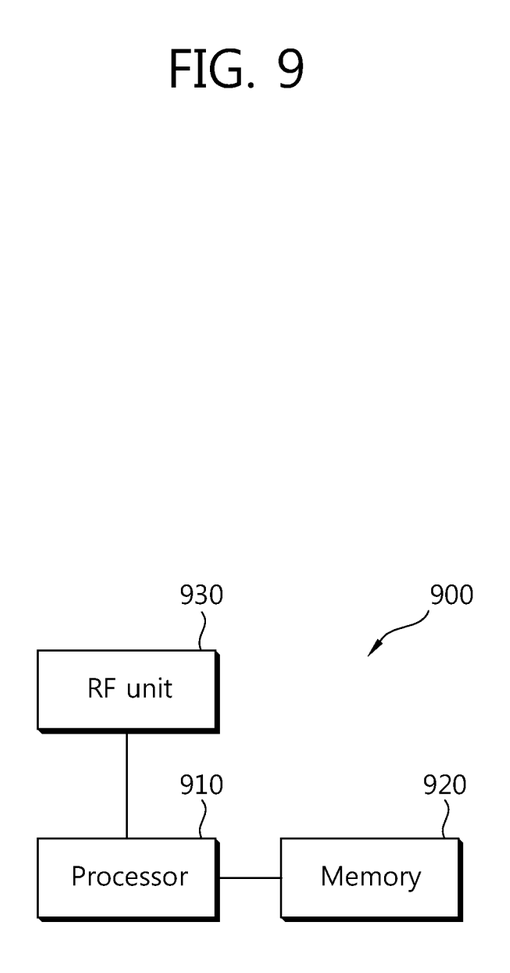
FIG. 9 is a block diagram showing a wireless device according to an embodiment of the present invention.

FIG. 9 is a block diagram showing a wireless device according to an embodiment of the present invention.

A wireless device 900 may include a processor 910, a memory 920, and a radio frequency (RF) unit 930.

The processor 910 implements the aforementioned operation of the wireless device. The processor 910 may generate a discovery signal and synchronization signal for a D2D communication, and may instruct the RF unit 930 to transmit the generated signal. The RF unit 930 transmits and receives a radio signal.

The memory 920 stores instructions for an operation of the processor 910. The stored instructions may be executed by the processor 910 to implement the aforementioned operation of the wireless device.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting a discovery signal for a device-to-device (D2D) communication in a wireless communication system, the method comprising:

generating, by a wireless device, a random sequence on the basis of a device identifier (ID);

determining, by the wireless device, first and second generation information on the basis of the random sequence;

generating, by the wireless device, a first and a second discovery sequence on the basis of the first and the second generation information; and transmitting, by the wireless device, the first and the second discovery sequence over one or more subframes to a different wireless device, wherein the subframe includes a first and a second slot respectively carrying the first and the second discovery sequence, and wherein the random sequence comprises a bit sequence, and the first and the second generation information is determined on the basis of bits in the bit sequence.

2. The method of claim 1, wherein the first and the second generation information comprises information regarding a cyclic shift (CS) used to generate the first and the second discovery sequence.

3. The method of claim 1, wherein the first and the second generation information comprises sequence mapping information indicating a radio resource to which the first and the second discovery sequence is mapped.

4. The method of claim 1, wherein the first and the second generation information comprises sequence hopping information indicating a basic sequence used as the first and the second discovery sequence among a plurality of basic sequences.

5. The method of claim 1, wherein the first and the second generation information comprises information regarding a reception ID used to identify the different wireless device.

6. The method of claim 1, wherein the first and the second discovery sequence is transmitted in one or more orthogonal frequency division multiplexing (OFDM) symbols in a subframe.

7. The method of claim 1, wherein the device ID comprises a transmit (TX) ID used to identify the wireless device.

8. The method of claim 6, wherein the device ID further comprises a receive (RX) ID used to identify the different wireless device.

9. The method of claim 1, wherein the device ID comprises a group ID used to identify a device group to which the wireless device belongs.

10. An apparatus for transmitting a discovery signal for a device-to-device (D2D) communication in a wireless communication system, the apparatus comprising:

a radio frequency (RF) unit configured to transmit and receive a radio signal; and a processor operatively coupled to the RF unit and configured to:

generate a random sequence on the basis of a device identifier (ID) for identifying the device;

determine first and second generation information on the basis of the random sequence;

generate a first and a second discovery sequence on the basis of the first and the second generation information; and instruct the RF unit to transmit the first and the second discovery sequence over one or more subframes to a different wireless device, wherein the subframe includes a first and a second slot respectively each carrying the first and the second discovery sequence, and wherein the random sequence comprises a bit sequence, and the first and the second generation information is determined on the basis of bits in the bit sequence.

\* \* \* \* \*